(12) United States Patent
Leeton et al.

(10) Patent No.: US 10,702,798 B2
(45) Date of Patent: Jul. 7, 2020

(54) IONIC LIQUID WASTE HANDLING SYSTEM

(71) Applicant: UOP LLC, Des Plaines, IL (US)

(72) Inventors: Eric Leeton, Corpus Christi, TX (US); Gregory J. Schrad, Naperville, IL (US); David S. Lafyatis, Schaumburg, IL (US); Matthew Lippmann, Chicago, IL (US); Douglas A. Nafis, Mount Prospect, IL (US)

(73) Assignee: UOP LLC, Des Plaines, IL (US)

( * ) Notice: Subject to any disclaimer, the term of this patent is extended or adjusted under 35 U.S.C. 154(b) by 929 days.

(21) Appl. No.: 14/921,156

(22) Filed: Oct. 23, 2015

(65) Prior Publication Data
US 2017/0113162 A1 Apr. 27, 2017

(51) Int. Cl.
| | | |
|---|---|---|
| *B01D 15/36* | (2006.01) | |
| *B01D 15/08* | (2006.01) | |
| *B01D 53/14* | (2006.01) | |
| *B01D 21/01* | (2006.01) | |
| *B01D 11/04* | (2006.01) | |
| *B01D 61/02* | (2006.01) | |
| *B03C 5/00* | (2006.01) | |
| *B03C 11/00* | (2006.01) | |
| *B03C 3/017* | (2006.01) | |

(52) U.S. Cl.
CPC ............ *B01D 15/361* (2013.01); *B01D 11/04* (2013.01); *B01D 15/08* (2013.01); *B01D 61/025* (2013.01); *B03C 3/017* (2013.01); *B03C 5/00* (2013.01); *B03C 11/00* (2013.01)

(58) Field of Classification Search
CPC ...... B01D 15/08; B01D 15/36; B01D 15/361; B01D 11/04; B01D 21/01; B01D 61/025; B01D 61/02; B01D 53/14; B03C 5/00
USPC .......................................................... 210/739
See application file for complete search history.

(56) References Cited

U.S. PATENT DOCUMENTS

| | | | |
|---|---|---|---|
| 4,774,375 A | 9/1988 | Hammershaimb et al. | |
| 8,653,318 B2 | 2/2014 | Liu et al. | |
| 8,692,048 B2 | 4/2014 | Liu et al. | |
| 2004/0188350 A1* | 9/2004 | Beste | B01D 15/00 |
| | | | 210/638 |
| 2012/0165593 A1 | 6/2012 | Liu et al. | |
| 2012/0172647 A1* | 7/2012 | Liu | C07C 2/58 |
| | | | 585/719 |

(Continued)

FOREIGN PATENT DOCUMENTS

WO 2014091016 6/2014

*Primary Examiner* — Robert Clemente
*Assistant Examiner* — Akash K Varma

(57) ABSTRACT

A process for treating an ionic liquid containing waste stream is described. If there is a liquid waste stream, the liquid waste stream is introduced into a liquid treatment zone. The ionic liquid in the liquid waste stream is neutralized. The concentration of the ionic liquid in the liquid waste stream is determined, and the allowed concentration of the ionic liquid in the liquid waste stream is determined. The concentration of the ionic liquid in the neutralized liquid waste stream is reduced to the allowed concentration, and the liquid waste stream having the allowed concentration is released. If there is a vapor waste stream, the vapor waste stream is introduced into a vapor treatment zone. The vapor waste stream is treated to form a treated vapor waste stream, and the treated vapor waste stream is released to a plant vapor treatment zone.

20 Claims, 1 Drawing Sheet

(56) References Cited

U.S. PATENT DOCUMENTS

2013/0292331 A1* 11/2013 Lipscomb .............. B01D 61/58
210/640
2015/0030524 A1* 1/2015 Ji ........................... C01B 32/50
423/437.1

\* cited by examiner

IONIC LIQUID WASTE HANDLING SYSTEM

BACKGROUND OF THE INVENTION

Various hydrocarbon conversion processes can utilize ionic liquid catalysts.

Alkylation is typically used to combine light olefins, for example mixtures of alkenes such as propylene and butylene, with isobutane to produce a relatively high-octane branched-chain paraffinic hydrocarbon fuel, including isoheptane and isooctane. Similarly, an alkylation reaction can be performed using an aromatic compound such as benzene in place of the isobutane. When using benzene, the product resulting from the alkylation reaction is an alkylbenzene (e.g. ethylbenzene, cumene, dodecylbenzene, etc.).

Processes for the oligomerization of light olefins (e.g. ethylene, propylene, and butylene) to produce higher carbon number olefin products (e.g. $C_{6+}$ olefins) are well known. Oligomerization processes have been employed to produce high quality motor fuel components as well as petrochemicals from ethylene, propylene, and butylene. These oligomerization processes are also referred to as catalytic condensation and polymerization, with the resulting motor fuel often referred to as polymer gasoline.

The disproportionation of paraffins (e.g., isopentane ($iC_5$)) involves reacting two moles of hydrocarbon to form one mole each of two different products, one having a carbon count greater than the starting material and the other having a carbon count less than the starting material. The total number of moles in the system remains the same throughout the process, but the products have different carbon counts from the reactants.

Isomerization of linear paraffins to their branched isomers increases their octane number and thus their value to a refiner. Isomerization processes involve reacting one mole of a hydrocarbon (e.g., normal pentane) to form one mole of an isomer of that specific hydrocarbon (e.g., isopentane). The total number of moles remains the same throughout this process, and the product has the same number of carbons as the reactant.

Acidic ionic liquids can be used as an alternative to the commonly used strong acid catalysts in hydrocarbon conversion processes. Ionic liquids are catalysts that can be used in a variety of catalytic reactions, including the alkylation of paraffins with olefins. Ionic liquids are salts comprised of cations and anions which typically melt below about 100° C.

Ionic liquids are essentially salts in a liquid state, and are described in U.S. Pat. Nos. 4,764,440, 5,104,840, and 5,824,832. The properties vary extensively for different ionic liquids, and the use of ionic liquids depends on the properties of a given ionic liquid. Depending on the organic cation of the ionic liquid and the anion, the ionic liquid can have very different properties.

Ionic liquids provide advantages over other catalysts, including being less corrosive than catalysts like HF, and being non-volatile.

Ionic liquids have also been used in separation processes, such as the removal of various contaminants from hydrocarbons as described in U.S. Pat. Nos. 7,749,377, 8,574,426, 8,574,427, 8,580,107, 8,608,943, 8,608,949, 8,608,950, 8,608,951, 8,709,236, for example, and the removal of contaminants from oxidation products as described in U.S. Pat. Nos. 8,754,254, 9,000,214, for example.

However, the use of ionic liquids presents unique and novel waste handling challenges due to the nature of the chemicals and compounds specific to the normal operation of the unit. Many of these substances, including but not limited to the ionic liquid itself, are not suitable to be released, drained, or otherwise discharged into standard refinery relief systems, waste handling systems, or other similar systems intended and designed to manage waste or unit non-product streams.

There is a need for a system for handling waste streams containing ionic liquids.

SUMMARY OF THE INVENTION

One aspect of the present invention is a process for treating an ionic liquid containing waste stream. In one embodiment, the process involves: if there is a liquid waste stream; introducing the liquid waste stream into a liquid treatment zone; neutralizing the ionic liquid in the liquid waste stream; determining a concentration of the ionic liquid in the liquid waste stream; determining an allowed concentration of the ionic liquid in the liquid waste stream; reducing the concentration of the ionic liquid in the neutralized liquid waste stream to the allowed concentration; and releasing the liquid waste stream having the allowed concentration; and if there is a vapor waste stream; introducing the vapor waste stream into a vapor treatment zone; treating the vapor waste stream to form a treated vapor waste stream; and releasing the treated vapor waste stream to a plant vapor treatment zone.

DETAILED DESCRIPTION OF THE INVENTION

Figure 1:
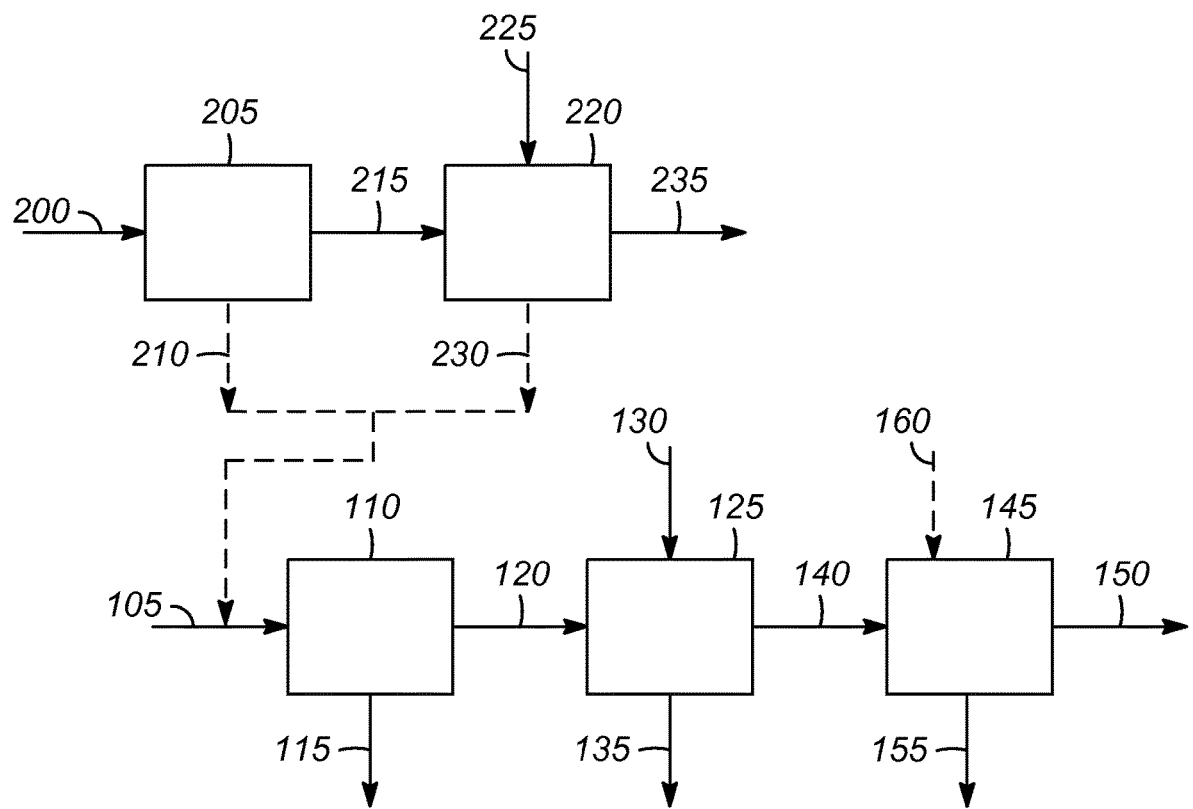
FIG. 1 illustrates one embodiment of a process for treating an acidic ionic liquid containing waste stream.

The ionic liquid waste handling system comprises two sub-systems: a vapor handling sub-system and a liquid handling sub-system.

The vapor sub-system is specifically engineered and designed to remove substances from vapors and volatile liquids which may be intentionally or unintentionally directed into the unit relief header. The relief header is referred to by several names, including flare header, acid flare header, vent header, and the like.

When there is a vapor waste stream, it is treated to remove any ionic liquid which may be present. The treated vapor stream is then released to the plant's regular vapor treatment system. In some embodiments, the treated vapor stream is sent to the relief header. There may be no ionic liquid in the vapor stream, in which case there will be no ionic liquid recovered. If ionic liquid is present and removed from the vapor stream, the recovered ionic liquid can be combined with the liquid waste stream and processed with the liquid waste stream.

The liquid sub-system is designed to scrub any liquid stream containing ionic liquid, including liquid streams which contain solids, that may intentionally or unintentionally be drained, discharged, or otherwise released from the process unit as well as streams that do not come from the process unit, including but not limited to, rain water, water used to clean equipment, and the like. Neutralizing may be accomplished by contacting the liquid streams with caustic or other similar neutralizing media. The liquid sub-system also provides the capability of segregating and containing these liquid streams containing ionic liquid for removal and disposal by means other than the standard refinery liquid waste handling systems. Process fluids may be introduced to the liquid subsystem in various ways, including but not limited to, surface water collection drains and hubs; elevated drain or collection system hubs; equipment drains; sample systems; etc. The liquid sub-system may employ basins, pits or sumps to collect, contain, segregate, and divert the liquid streams. Mixers or agitators may be employed in one or more pieces of equipment to improve the efficiency of the process.

The liquid sub-system is also capable of handling solids contained in the ionic liquid stream, such as those formed in a hydrocarbon conversion processes, such as alkylation, oligomerization, isomerization, disproportionation, and reverse disproportionation, and separation processes. The liquid sub-system is capable of handling and managing various chemicals, and by-products of the hydrocarbon conversion or separation processes. For example, an alkylation process may utilize HCl and/or organic chlorides and may produce conjunct polymer by-products. It can also handle and manage typical hydrocarbon streams that are also found in hydrocarbon conversion and separation process units.

In some embodiments, flocculants and/or chelating agents may be employed to help with settling, segregation, and or handling of any of the waste streams managed by the waste handling system.

There is at least one waste stream, which could be a vapor stream, a liquid stream, or a combination of a vapor stream and a liquid stream. There can be one or more vapor streams and/or one or more liquid streams. One or more vapor streams can be combined for processing, or they can be treated separately. One or more liquid streams can be combined for processing, or they can be treated separately. One or more vapor streams can be combined with one or more liquid streams, or they can be treated separately.

As illustrated in FIG. 1, a liquid waste stream 105 containing ionic liquid can be sent to an optional separation zone 110 where a portion of the ionic liquid is removed in stream 115. Suitable separation zones 110 include but are not limited to, gravity settlers, coalescers, electrostatic precipitators, osmotic membranes, and hydrocyclones.

The source of the liquid waste stream 105 containing the ionic liquid is not limited. It can come from many different sources. For example, it could be a stream from a hydrocarbon conversion or separation process which contains hydrocarbons along with the ionic liquid. It might come from the cleanup of a spill, a process unit cleaning process, water that has collected in the area of the process unit, rain water, and the like.

The liquid waste stream 105 can contain any acidic ionic liquid. There can be one or more acidic ionic liquids in the liquid waste stream 105.

The acidic ionic liquid comprises an organic cation and an anion. Examples of cations include, but are not limited to, nitrogen-containing cations and phosphorus-containing cations. Suitable organic cations include, but are not limited to:

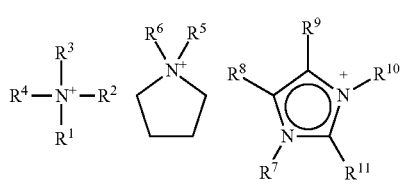

-continued

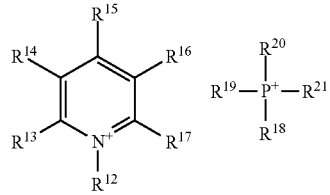

where $R^1$-$R^{21}$ are independently selected from $C_1$-$C_{20}$ hydrocarbons, $C_1$-$C_{20}$ hydrocarbon derivatives, halogens, and H. Suitable hydrocarbons and hydrocarbon derivatives include saturated and unsaturated hydrocarbons, halogen substituted and partially substituted hydrocarbons and mixtures thereof. $C_1$-$C_8$ hydrocarbons are particularly suitable. Lactamium based ionic liquids can also be used including, but not limited to, those described in U.S. Pat. No. 8,709,236, U.S. application Ser. No. 14/271,308, entitled Synthesis of Lactam Based Ionic Liquids, filed May 6, 2014, and U.S. application Ser. No. 14/271,319, entitled Synthesis of N-Derivatized Lactam Based Ionic Liquids, filed May 6, 2014, which are incorporated by reference.

The anion can be derived from halides, typically halometallates, and combinations thereof. The anion is typically derived from metal and nonmetal halides, such as metal and nonmetal chlorides, bromides, iodides, fluorides, or combinations thereof. Combinations of halides include, but are not limited to, mixtures of two or more metal or nonmetal halides (e.g., $AlCl_4^-$ and $BF_4^-$), and mixtures of two or more halides with a single metal or nonmetal (e.g., $AlCl_3Br^-$). In some embodiments, the metal is aluminum, with the mole fraction of aluminum ranging from 0<Al<0.25 in the anion. Examples of anions include, but are not limited to, $AlCl_4^-$, $Al_2Cl_7^-$, $Al_3Cl_{10}^-$, $AlCl_3Br^-$, $Al_2Cl_6Br^-$, $Al_3Cl_9Br^-$, $AlBr_4^-$, $Al_2Br_7^-$, $Al_3Br_{10}^-$, $GaCl_4^-$, $Ga_2Cl_7^-$, $Ga_3Cl_{10}^-$, $GaCl_3Br^-$, $Ga_2Cl_6Br^-$, $Ga_3Cl_9Br^-$, $CuCl_2^-$, $Cu_2Cl_3^-$, $Cu_3Cl_4^-$, $ZnCl_3^-$, $FeCl_3^-$, $FeCl_4^-$, $Fe_3Cl_7^-$, $PF_6^-$, and $BF_4^-$.

The effluent 120 from separation zone 110, which has a lower level of ionic liquid than incoming liquid waste stream 105, is sent to a neutralization zone 125.

A neutralization medium stream 130 is introduced into the neutralization zone 125. The neutralization medium neutralizes the acidic ionic liquid in effluent 120. In some embodiments, the neutralization medium can be a basic compound which reacts with the acidic ionic liquid. In other embodiments, the neutralization medium does not react with the ionic liquid, but binds with the ionic liquid making it less reactive or unreactive. Suitable neutralization media include, but are not limited to caustic (e.g., NaOH, KOH, or CaO), metal hydrides, ion exchange resins, and the like.

The spent neutralization medium stream 135 can be processed (not shown) and recycled to the neutralization zone 125, if desired.

The ionic liquid concentration of the effluent 140 from the neutralization zone 125 is determined. The concentration can be determined using any suitable analytical method to measure an ion in the ionic liquid, such as phosphorous, for example.

The allowed concentration in the ionic liquid in the waste stream is also determined. The allowed concentration can be determined from the toxicity data for the ionic liquid, federal, state, and/or local regulations, and/or testing (e.g., brine kill or fish kill testing). The allowed concentration may vary based on the ionic liquid present in the waste stream.

The effluent 140 from the neutralization zone 125 is sent to a zone 145 where the concentration of the ionic liquid in the effluent 140 is reduced to the allowed concentration. Effluent stream 150, which has the allowed concentration, can then be released.

In some embodiments, the concentration of the ionic liquid in effluent 140 can be reduced in zone 145 using a variety of processes including, but not limited to, at least one of gravity, reverse osmosis, flocculation, chelation, electrostatic precipitation, a guard bed, and a scrubber.

In reverse osmosis, applied pressure is used to overcome osmotic pressure. The ionic liquid is retained on the pressurized side of the membrane and the waste stream is allowed to pass to the other side. The retained ionic liquid would be removed as ionic liquid stream 155.

In flocculation, a stream 160 containing a flocculant is added to the effluent 140 in zone 145, causing the ionic liquid droplets dispersed in the effluent 140 come together and form larger particles. Over time, the larger particles can come together and form a separate phase. Suitable flocculants include, but are not limited to, iron compounds, copper compounds, polymers, polyelectrolytes. The flocculant and ionic liquid form a separate phase and are removed as ionic liquid stream 155. The second phase can be treated to separate the flocculant and the ionic liquid. The flocculant and ionic liquid can then be recovered and processed to be reused, if desired (not shown).

With chelation, a stream 160 containing a chelating agent is added to the effluent 140 in zone 145 to form a complex with the ionic liquid. Suitable chelating agents include, but are not limited to, glutamic acid. The complex forms a separate phase and is removed as ionic liquid stream 155. The second phase can be treated to reclaim the chelating agent and the ionic liquid (not shown). Suitable chelating agents include, but are not limited to citric acid, proteins, and polysaccharides.

The guard bed can contain at least one of molecular sieves, ion exchange resins, adsorbents, and absorbents. The ionic liquid is trapped in the guard bed, and the stream which exits from the guard bed has a lower level of ionic liquid than the incoming effluent 140. The ionic liquid can be recovered from the guard bed and recycled (not shown).

With a scrubber, the effluent 140 is contacted with a stream 160 containing a scrubbing liquid in zone 145, and the ionic liquid is transferred to the scrubbing liquid. The scrubbed effluent stream 150 has a lower concentration of ionic liquid than does the incoming effluent 140. The scrubbed effluent stream 150 has the allowed concentration. In some embodiments, the scrubber can comprise a packed column or a column containing a plurality of trays. There can be one or more scrubbers. The ionic liquid stream 155 can be recovered and/or processed and/or recycled.

In some embodiments, the concentration of the ionic liquid in the effluent 140 is reduced by removing at least a portion of the ionic liquid in the effluent 140. In other embodiments, the concentration of the ionic liquid in the effluent 140 is reduced by dilution.

In some embodiments, when the effluent 140 is a liquid stream, the ionic liquid can be separated from the liquid stream using at least one of gravity, flocculants, chelating agents, reverse osmosis, guard beds, and scrubbers.

Figure 2:
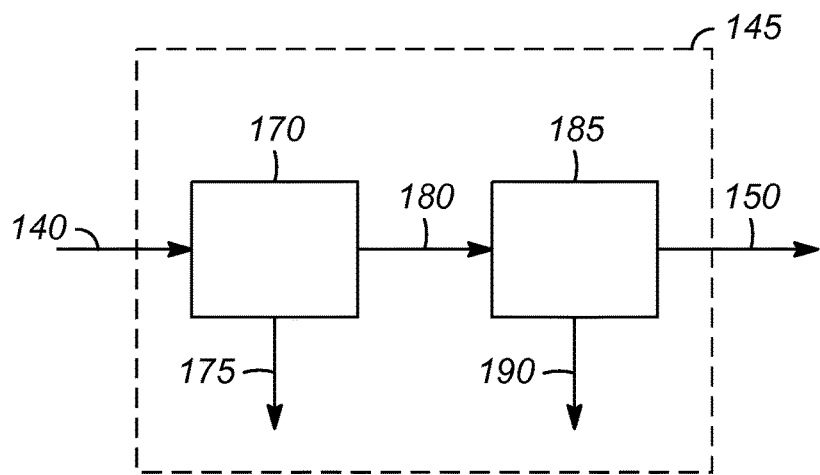
FIG. 2 illustrates one embodiment of a zone for reducing the concentration of ionic liquid in the waste stream.

FIG. 2 illustrates one embodiment of a zone 145 for reducing the concentration of the ionic liquid in the effluent 140 by removing ionic liquid. The effluent 140 is sent to a separation zone 170. Suitable separation zones 170 include, but are not limited to, gravity settlers, flocculation vessels, chelation vessels, and guard beds.

The effluent 180 from the separation zone 170 is sent to a scrubber 185 for further removal of ionic liquid stream 190.

Ionic liquid streams 175 and 190 can be recovered. Either or both can be further processed and/or recycled to a reaction zone (not shown), as desired.

Treated effluent stream 150 has the allowed concentration of ionic liquid and can be released.

In some embodiments, the concentration of the ionic liquid in the effluent 140 can be reduced by diluting the waste stream. When the waste stream is an aqueous stream, it can be diluted by adding water.

In some embodiments, a liquid waste stream may include solids, such as salts formed in a process, process byproducts, metal fines and/or scale from process equipment, and dirt. The solids can be separated from the liquid stream. Suitable separation methods include, but are not limited to gravity settling, hydrocyclones, filter press, and osmotic membranes. The solids can be neutralized, if needed. The solids can be disposed of, reused, and/or recycled, depending on the type of solids.

The effluent from the various units can be tested to determine the concentration of ionic liquid. If the concentration exceeds the allowed concentration, the effluent can be recycled to a preceding unit and retreated until it meets the allowed concentration.

In some embodiments, the waste stream containing the ionic liquid is isolated from non-ionic liquid containing waste streams before neutralizing the ionic liquid. The non-ionic liquid containing waste streams can be processed in a conventional manner.

The vapor waste stream 200 can be treated to remove any ionic liquid which may be present. There may or may not be any ionic liquid in the vapor waste stream 200. If ionic liquid is present, the treatment removes it. The vapor waste stream 200 can be treated using one or more treating zones, such as a gravity separation zone, an electrostatic precipitation zone, and/or a scrubbing zone.

As shown, the vapor waste stream 200 is sent to a gravity separation zone 205, such as a knockout drum. The gravity separation zone 205 removes entrained liquids (if present) from the vapor waste stream 200 prior to directing it to a second separation zone. Ionic liquid (if present) is removed as ionic liquid stream 210.

The first treated vapor waste stream 215 is sent to a scrubbing zone 220. Scrubbing may be accomplished by contacting the first treated vapor waste stream 215 with a stream 225 comprising caustic (or some other similar neutralizing and/or absorbing media). Stream 230 contains the spent caustic and any ionic liquid removed from the first treated vapor waste stream 215. The second treated vapor waste stream 235 can then be sent to the general plant flare header (not shown).

There can be one or more scrubbing vessels in the scrubbing zone 220. In some embodiments, the scrubbing vessels can contain trays or packing to allow the scrubbing medium to contact the vapor.

The scrubbing zone 220 can be operated so that the scrubbing medium contacts the vapors concurrently or counter-currently.

In some embodiments, the scrubbing medium can be recirculated from a suitably sized sump in the scrubbing zone 220. Alternatively, it can be processed on a "once through" basis. In some embodiments, the scrubbing medium can be supplied from some combination of the two practices. For example, the system could be designed to operate in either manner. Alternatively, the scrubbing medium could be recirculated, with periodic addition and removal of a portion of the scrubbing medium.

In an electrostatic precipitation zone, an electrostatic charge is used to remove the ionic liquid from the vapor waste stream.

In embodiments where ionic liquid is present in the vapor stream, entrained ionic liquid is removed as ionic liquid stream 210 from the vapor waste stream 200 to form the first treated vapor waste stream 215, which has a reduced ionic liquid content compared to the ionic liquid content of the vapor waste stream 200. The first treated vapor waste stream 215 is introduced into the scrubbing zone 220, for example, to form the second treated vapor waste stream 235. Stream 230 containing the entrained ionic liquid and the scrubbing medium can be recovered and/or processed and/or recycled. In some embodiments, the second treated vapor waste stream 235 can be sent to a flare.

In some embodiments, the scrubbing zone 220 can comprise one or more packed columns or columns containing a plurality of trays.

In some embodiments where ionic liquid is present in the vapor waste stream 200, all or a portion of ionic liquid stream 210 and/or stream 230 can be sent to the liquid waste treatment zone. It can be combined with the liquid waste stream 105 (or a later stream) or introduced into separation zone 110, neutralization zone 125, and/or zone 145.

In some embodiments, one or more of the vapor streams can be diluted by adding a gas. Suitable gases include, but are not limited to, air, nitrogen, steam and the like.

By the term "about," we mean within 10% of the value, or within 5%, or within 1%.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

Specific Embodiments

While the following is described in conjunction with specific embodiments, it will be understood that this description is intended to illustrate and not limit the scope of the preceding description and the appended claims.

A first embodiment of the invention is a process for treating an ionic liquid containing waste stream comprising: if there is a liquid waste stream; introducing the liquid waste stream into a liquid treatment zone; neutralizing the ionic liquid in the liquid waste stream; determining a concentration of the ionic liquid in the liquid waste stream; determining an allowed concentration of the ionic liquid in the liquid waste stream; reducing the concentration of the ionic liquid in the neutralized liquid waste stream to the allowed concentration; and releasing the liquid waste stream having the allowed concentration; and if there is a vapor waste stream; introducing the vapor waste stream into a vapor treatment zone; treating the vapor waste stream to form a treated vapor waste stream; and releasing the treated vapor waste stream to a plant vapor treatment zone. An embodiment of the invention is one, any or all of prior embodiments in this paragraph up through the first embodiment in this paragraph wherein treating the vapor waste stream forms a recovered liquid stream, and further comprising combining the recovered liquid stream with the liquid waste stream. An embodiment of the invention is one, any or all of prior embodiments in this paragraph up through the first embodiment in this paragraph wherein neutralizing the ionic liquid comprises reacting the ionic liquid with a basic compound, or contacting the ionic liquid with an ion exchange resin. An embodiment of the invention is one, any or all of prior embodiments in this paragraph up through the first embodiment in this paragraph wherein reducing the concentration of the ionic liquid comprises removing at least a portion of the ionic liquid from the neutralized liquid waste stream using at least one of gravity, reverse osmosis, flocculation, chelation, electrostatic precipitation, a guard bed, and a scrubber. An embodiment of the invention is one, any or all of prior embodiments in this paragraph up through the first embodiment in this paragraph wherein the at least the portion of the ionic liquid is removed using flocculation and wherein the flocculant comprises at least one of iron compounds, copper compounds, polymers, and polyelectrolytes. An embodiment of the invention is one, any or all of prior embodiments in this paragraph up through the first embodiment in this paragraph wherein the at least the portion of the ionic liquid is removed using a guard bed and wherein the guard bed comprises at least one of molecular sieves, ion exchange resins, adsorbents, and absorbents. An embodiment of the invention is one, any or all of prior embodiments in this paragraph up through the first embodiment in this paragraph wherein the at least the portion of the ionic liquid is removed using chelation and wherein the chelating agent comprises at least one of citric acid, proteins, and polysaccharides. An embodiment of the invention is one, any or all of prior embodiments in this paragraph up through the first embodiment in this paragraph wherein the at least the portion of the ionic liquid is removed using a scrubber, and further comprising separating ionic liquid from the neutralized liquid waste stream to form a second liquid stream having a reduced ionic liquid content and an ionic liquid stream; introducing the second liquid stream into an scrubber to form a third liquid stream having the allowed concentration; and recovering the ionic liquid stream. An embodiment of the invention is one, any or all of prior embodiments in this paragraph up through the first embodiment in this paragraph wherein the ionic liquid is separated from the liquid stream using at least one of gravity, flocculants, chelating agents, and guard beds. An embodiment of the invention is one, any or all of prior embodiments in this paragraph up through the first embodiment in this paragraph wherein the scrubber comprises a packed column or a column containing a plurality of trays. An embodiment of the invention is one, any or all of prior embodiments in this paragraph up through the first embodiment in this paragraph wherein treating the vapor waste stream comprises separating entrained ionic liquid from the vapor waste stream to form a second vapor stream having a reduced ionic liquid content and an entrained ionic liquid stream; introducing the second vapor stream to a scrubber to form a third vapor stream; and recovering the entrained ionic liquid stream; wherein releasing the treated vapor waste stream comprises releasing the third vapor stream. An embodiment of the invention is one, any or all of prior embodiments in this paragraph up through the first embodiment in this paragraph wherein the scrubber comprises a packed column or a column containing a plurality of trays. An embodiment of the invention is one, any or all of prior embodiments in this paragraph up through the first embodiment in this paragraph further comprising separating a portion of the ionic liquid from the liquid waste stream before neutralizing the ionic liquid. An embodiment of the invention is one, any or all of prior embodiments in this paragraph up through the first embodiment in this paragraph wherein the portion of the ionic liquid is separated by gravity. An embodiment of the invention is one, any or all of prior embodiments in this paragraph up through the first embodiment in this paragraph further comprising isolating the ionic liquid containing waste stream from non-ionic liquid containing waste streams before neutralizing the ionic liquid. An embodiment of the invention is one, any or all of prior embodiments in this paragraph up through the first embodiment in this paragraph wherein reducing the concentration of the ionic liquid in the neutralized liquid waste stream comprises diluting the neutralized liquid waste stream. An embodiment of the invention is one, any or all of prior embodiments in this paragraph up through the first embodiment in this paragraph wherein when the waste stream is an aqueous stream, diluting the neutralized waste stream comprises adding water to the neutralized waste stream. An embodiment of the invention is one, any or all of prior embodiments in this paragraph up through the first embodiment in this paragraph wherein the liquid waste stream comprises a liquid stream containing solids and further comprising; separating the solids from the liquid stream.

A second embodiment of the invention is a process for treating an acidic ionic liquid containing waste stream comprising: if there is a liquid waste stream; introducing the liquid waste stream into a liquid treatment zone; neutralizing the ionic liquid in the liquid waste stream, wherein neutralizing the ionic liquid comprises at least one of reacting the ionic liquid with a basic compound, or contacting the ionic liquid with an ion exchange resin; determining a concentration of the ionic liquid in the liquid waste stream; determining an allowed concentration of the ionic liquid in the liquid waste stream; reducing the concentration of the ionic liquid in the neutralized liquid waste stream to the allowed concentration by removing at least a portion of the ionic liquid or diluting the neutralized waste stream, wherein the at least the portion of the ionic liquid is removed using at least one of gravity, reverse osmosis, flocculation, chelation, electrostatic precipitation, a guard bed, and a scrubber; and releasing the liquid waste stream having the allowed concentration; and if there is a vapor waste stream; introducing the vapor waste stream into a vapor treatment zone; treating the vapor waste stream to form a treated vapor waste stream; and releasing the treated vapor waste stream to a plant vapor treatment zone. An embodiment of the invention is one, any or all of prior embodiments in this paragraph up through the second embodiment in this paragraph wherein treating the vapor waste stream forms a recovered liquid stream, and further comprising combining the recovered liquid stream with the liquid waste stream.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

What is claimed is:

1. A process for treating an ionic liquid containing waste stream from an ionic liquid alkylation process, wherein the waste stream comprises a liquid waste stream containing the ionic liquid, the process comprising:
   introducing the liquid waste stream into a liquid treatment zone;
   neutralizing the ionic liquid in the liquid waste stream by reacting the ionic liquid with a basic compound, or contacting the ionic liquid with an ion exchange resin to bind the ionic liquid;
   determining a concentration of the ionic liquid in the liquid waste stream;
   determining an allowed concentration of the ionic liquid in the liquid waste stream for release into a waste handling system;
   reducing the concentration of the ionic liquid in the neutralized liquid waste stream to the allowed concentration; and
   releasing the liquid waste stream having the allowed concentration into a waste handling system.

2. The process of claim 1 further comprising:
   introducing a vapor waste stream containing the ionic liquid from the ionic liquid alkylation process into a vapor treatment zone;
   treating the vapor waste stream to remove the ionic liquid to form a treated vapor waste stream and a recovered liquid stream, wherein treating the vapor waste stream comprising treating the vapor waste stream using one or more of: gravity separation, electrostatic separation, or scrubbing;
   releasing the treated vapor waste stream to a plant vapor treatment zone; and
   combining the recovered liquid stream with the liquid waste stream having the allowed concentration.

3. The process of claim 1 wherein neutralizing the ionic liquid comprises reacting the ionic liquid with the basic compound, and wherein the basic compound comprises caustic or a metal hydride.

4. The process of claim 1 wherein reducing the concentration of the ionic liquid comprises removing at least a portion of the ionic liquid from the neutralized liquid waste stream using at least one of gravity, reverse osmosis, flocculation, chelation, electrostatic precipitation, a guard bed, and a scrubber.

5. The process of claim 4 wherein the at least the portion of the ionic liquid is removed using flocculation and wherein the flocculant comprises at least one of iron compounds, copper compounds, polymers, and polyelectrolytes.

6. The process of claim 4 wherein the at least the portion of the ionic liquid is removed using a guard bed and wherein the guard bed comprises at least one of molecular sieves, ion exchange resins, adsorbents, and absorbents.

7. The process of claim 4 wherein the at least the portion of the ionic liquid is removed using chelation and wherein the chelating agent comprises at least one of citric acid, proteins, and polysaccharides.

8. The process of claim 4 wherein the at least the portion of the ionic liquid is removed using a scrubber, and further comprising:

separating the ionic liquid from the neutralized liquid waste stream to form a second liquid stream having a reduced ionic liquid content and an ionic liquid stream;

introducing the second liquid stream into the scrubber to form a third liquid stream having the allowed concentration; and recovering the ionic liquid stream.

9. The process of claim 8 wherein the ionic liquid is separated from the liquid stream using at least one of gravity, flocculants, chelating agents, and guard beds.

10. The process of claim 8 wherein the scrubber comprises a packed column or a column containing a plurality of trays.

11. The process of claim 2 wherein treating the vapor waste stream comprises:

separating entrained ionic liquid from the vapor waste stream to form a second vapor stream having a reduced ionic liquid content and an entrained ionic liquid stream;

introducing the second vapor stream to a scrubber to form a third vapor stream; and recovering the entrained ionic liquid stream;

wherein releasing the treated vapor waste stream comprises releasing the third vapor stream.

12. The process of claim 11 wherein the scrubber comprises a packed column or a column containing a plurality of trays.

13. The process of claim 1 further comprising separating a portion of the ionic liquid from the liquid waste stream before neutralizing the ionic liquid.

14. The process of claim 13 wherein the portion of the ionic liquid is separated by gravity.

15. The process of claim 1 further comprising:

isolating the ionic liquid containing waste stream from non-ionic liquid containing waste stream before neutralizing the ionic liquid.

16. The process of claim 1 wherein reducing the concentration of the ionic liquid in the neutralized liquid waste stream comprises diluting the neutralized liquid waste stream.

17. The process of claim 16 wherein when the waste stream is an aqueous stream, diluting the neutralized waste stream comprises adding water to the neutralized waste stream.

18. The process of claim 1 wherein the liquid waste stream comprises a liquid stream containing solids and further comprising:

separating the solids from the liquid stream.

19. A process for treating an acidic ionic liquid containing waste stream from an ionic liquid alkylation process, wherein the waste stream comprises a liquid waste stream containing the acidic ionic liquid the process comprising:

introducing the liquid waste stream into a liquid treatment zone;

neutralizing the acidic ionic liquid in the liquid waste stream, wherein neutralizing the acidic ionic liquid comprises at least one of reacting the acidic ionic liquid with a basic compound, or contacting the acidic ionic liquid with an ion exchange resin to bind the ionic liquid;

determining a concentration of the ionic liquid in the liquid waste stream;

determining an allowed concentration of the ionic liquid in the liquid waste stream for release into a waste handling system;

reducing the concentration of the ionic liquid in the neutralized liquid waste stream to the allowed concentration by removing at least a portion of the ionic liquid or diluting the neutralized waste stream, wherein the at least the portion of the ionic liquid is removed using at least one of gravity, reverse osmosis, flocculation, chelation, electrostatic precipitation, a guard bed, and a scrubber; and releasing the liquid waste stream having the allowed concentration into a waste handling system.

20. The process of claim 19 further comprising:

introducing a vapor waste stream containing the ionic liquid from the ionic liquid alkylation process into a vapor treatment zone;

treating the vapor waste stream to remove the ionic liquid to form a treated vapor waste stream and a recovered liquid stream, wherein treating the vapor waste stream comprising treating the vapor waste stream using one or more of: gravity separation, electrostatic separation, or scrubbing;

releasing the treated vapor waste stream to a plant vapor treatment zone; and combining the recovered liquid stream with the liquid waste stream having the allowed concentration.

\* \* \* \* \*